(12) United States Patent
Mettan (10) Patent No.: US 9,225,009 B2
(45) Date of Patent: Dec. 29, 2015

(54) SELF-ASSEMBLED COMPOSITE OF GRAPHENE OXIDE AND TETRAVALENT VANADIUM OXOHYDROXIDE

(71) Applicant: BELENOS CLEAN POWER HOLDING AG, Bienne (CH)

(72) Inventor: Yoann Mettan, Evionnaz (CH)

(73) Assignee: Belenos Clean Power Holding AG, Bienne (CH)

( * ) Notice: Subject to any disclaimer, the term of this patent is extended or adjusted under 35 U.S.C. 154(b) by 108 days.

(21) Appl. No.: 14/100,858

(22) Filed: Dec. 9, 2013

(65) Prior Publication Data
US 2014/0178763 A1 Jun. 26, 2014

(30) Foreign Application Priority Data

Dec. 21, 2012 (EP) .................... 12198987
Jan. 10, 2013 (EP) .................... 13150846

(51) Int. Cl.

| | |
|---|---|
| *H01M 4/131* | (2010.01) |
| *H01M 4/04* | (2006.01) |
| *H01M 4/1391* | (2010.01) |
| *H01M 4/36* | (2006.01) |
| *H01M 4/485* | (2010.01) |
| *H01M 4/583* | (2010.01) |
| *H01M 10/052* | (2010.01) |
| *H01M 10/0525* | (2010.01) |
| *H01M 4/133* | (2010.01) |
| *H01M 4/1393* | (2010.01) |
| *H01M 10/54* | (2006.01) |

(52) U.S. Cl.
CPC ............ *H01M 4/131* (2013.01); *H01M 4/0471* (2013.01); *H01M 4/133* (2013.01); *H01M 4/1391* (2013.01); *H01M 4/1393* (2013.01); *H01M 4/364* (2013.01); *H01M 4/485* (2013.01); *H01M 4/583* (2013.01); *H01M 10/052* (2013.01); *H01M 10/0525* (2013.01); *H01M 10/54* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,670,229 A * | 6/1987 | Wiewiorowski et al. | ........ 423/55 |
| 2002/0112968 A1 * | 8/2002 | Shiroto et al. | ................ 205/496 |
| 2010/0081057 A1 | 4/2010 | Liu et al. | |

(Continued)

FOREIGN PATENT DOCUMENTS

| | | |
|---|---|---|
| EP | 2 445 049 A1 | 4/2012 |
| WO | 2010/030361 A1 | 3/2010 |

OTHER PUBLICATIONS

Vanessa Legagneur, et al..,"New layered vanadium oxides MyH1-y V₃O₈.nH2O (M=Li, Na, K) obtained by oxidation of the precursor H₂V₃O₈", Journal of Materials of Chemistry , Nov. 2000, pp. 2805-2810, vol. 10, No. 12.

(Continued)

*Primary Examiner* — Patrick Ryan
*Assistant Examiner* — Wyatt McConnell
(74) *Attorney, Agent, or Firm* — Sughrue Mion, PLLC (57) ABSTRACT

A composite material comprising graphene oxide and an electrochemically active ingredient, in particular $H_{4-x}V_3O_8$ with x ranging from 0.1 to 2.2, as well as a method for its manufacture were developed. The composite material is suitable for being used as electrode in an electrochemical cell.

20 Claims, 8 Drawing Sheets

(56) References Cited

U.S. PATENT DOCUMENTS

| | | |
|---|---|---|
| 2010/0143798 A1 | 6/2010 | Zhamu et al. |
| 2011/0045347 A1 | 2/2011 | Liu et al. |
| 2012/0008156 A1 | 1/2012 | Peng |
| 2012/0100402 A1* | 4/2012 | Nesper et al. ............. 429/48 |
| 2012/0171574 A1 | 7/2012 | Zhamu et al. |
| 2012/0321953 A1 | 12/2012 | Chen et al. |
| 2013/0157138 A1 | 6/2013 | Mettan et al. |

OTHER PUBLICATIONS

Daniel R. Dreyer, et al.. "The chemistry of graphene oxide", Chem. Soc. Rev., 2010, pp. 228-240, vol. 39.

K.S. Novoselov, et al.., "Electric Field Effect in Atomically Thin Carbon Films", Science, Oct. 2004, vol. 306.

Yanwu Zhu, et al.., "Graphene and Graphene Oxide: Synthesis, Properties, and Applications", Advanced Materials (Material Views), 2010, pp. 1-19, vol. XX.

Sasha Stankovich, et al.., "Synthesis of graphene-based nanosheets via chemical reduction of exfoliated graphite oxide", Carbon 45, 2007, pp. 1558-1565.

Tommy Kasparet al.., "Graphen-abgeleitete Materialien", DISS ETHR Nr.18931, 2010, pp. 1-157.

Zhong-Shuai Wu et al., "Graphene Anchored with $Co_3O_4$ Nanoparlicles as anode of Lithium Ion Batteries with Enhanced Reversible Capacity and Cyclic Performance", acsNano, 2010, pp. 3187-3194, vol. 4, No. 6.

European Search Report for EP13150846 dated Apr. 11, 2013.

* cited by examiner

SELF-ASSEMBLED COMPOSITE OF GRAPHENE OXIDE AND TETRAVALENT VANADIUM OXOHYDROXIDE

This application claims priority from European Patent Application No. 12198987.5 filed Dec. 21, 2012 and European Patent Application No. 13150846.7 filed Jan. 10, 2013, the entire disclosure of which is incorporated herein by reference.

TECHNICAL FIELD

This invention relates to composites of graphene oxide and tetravalent vanadium oxohydroxide, and to a method for producing electrode materials from such composites, as well as to the electrode materials produced.

BACKGROUND OF THE INVENTION

Graphite oxide is a material obtained by oxidation of natural or synthetic graphite. The different oxidation procedures are named according to their respective inventors, i.e. the Brodie method, the Staudenmaier method, the Hummer and Offeman method [1]. Graphite oxide consists of multiple stacked graphene sheets bearing oxygen containing functional groups such as epoxy, hydroxyl or carboxylic moieties. Individual sheets of graphite oxide will be referred to as graphene oxide in the following.

Graphite oxide is a long known material that regained significant attention since Andre Geim and Konstantin Novoselov were awarded the Nobel price of physics 2010 for the discovery of graphene, a one-atom-thick planar sheet of sp2-bounded carbon [2]. Since then many fields ranging from optical to electrochemical applications have benefited from the implementation of graphene, owing to the outstanding transport and mechanical properties of the material [3].

Graphite oxide can be conveniently used as graphene precursor, especially for the production of bulk quantities. The exfoliation of graphite oxide to graphene oxide can be carried out in aqueous medium in concentrations up to 1 g/L [4]. The thermal or chemical reduction of graphene oxide yields reduced graphene oxide (RedGO) [5]. The C:O ratio rises from about 3 in graphite oxide to higher than 8 if graphite oxide is (i) heated to more than 1000° C. or (ii) treated hydrothermally at 150° C. or (iii) exfoliated to graphene oxide and reduced chemically [6]. While graphene oxide is an insulator, the electronic conductivity of RedGO is sufficient for most applications, such as use in electrochemical storage devices [4].

However, the composite formation of graphene oxide with a selected material and the subsequent reduction of graphene oxide to RedGO are by no means trivial. In fact, the prior art teaches reduction of graphene oxide to RedGO before or at least in an early step of the composite formation [7][8][9][10][11]. Additionally, a heating step to at least 300° C. is commonly applied to maximize the electronic conductivity of the composite [12].

The heating step to at least 300° C. restricts the type of material to be used in a composite, to materials that can withstand 300° C. and more. Above all, the main drawbacks in the composite formation procedures of the prior art originate from the fact that RedGO is used instead of graphene oxide. RedGO, like graphene sheets, graphene nano platelets and the like cannot be dispersed in high concentration and in a monolayer form in water without using surfactants, organic solvents or other chemicals generally acting as stabilizers to prevent aggregation and/or precipitation [7][8][9][10].

Due to these surfactants, organic solvents and/or other chemicals, the prior art fails to keep the carbon content of RedGO composites below 5%, which is highly desirable for their implementation in electrochemical storage devices. Further, the presence of reducing agents and/or stabilizers in the reaction mixture used for composite formation implies a work up and/or purification steps such as pyrolysis of the surfactants. Thus the high RedGO content and the complexity of the procedures in the prior art counterbalance the advantage of using graphene or reduced graphene oxide, which are expensive materials with unique properties.

Therefore there is still a need for an improved composite material comprising at least one Electrochemically Active Material (EAM) in nanoparticulate form and RedGO, especially for an improved composite material comprising at least one EAM in an anisotropic form like fibers and RedGO, as well as a method for its manufacture.

SUMMARY OF THE INVENTION

In a first aspect, the present invention provides a precursor composite for an electrode material, the composite comprising graphene oxide with a C:O ratio between 2.7 and 3.5 and electrochemically active material (EAM) comprising a tetravalent vanadium oxohydroxide, preferably such composite wherein the C:O ratio of the graphene oxide is between 2.7 and 3.1, more preferably between 2.9 and 3.1. For clarity reasons, in connection with the specific method wherein the tetravalent vanadium oxohydroxide is partially oxidized, the tetravalent vanadium oxohydroxide starting material is termed startEAM while the vanadium oxohydroxide that has been partly oxidized to the pentavalent state and that is present in connection with RedGO is termed oxEAM to indicate the partial oxidation due to the reaction with the graphene oxide. Where the product is concerned generically, the abbreviation EAM is used.

In a second aspect, the present invention provides a method for preparing the precursor composite comprising the self-assembly of graphene oxide mixed with nanoparticulate tetravalent vanadium oxohydroxide in an aqueous solution, in particular (i) at a preferably not enhanced temperature, e.g. at room temperature or lower and (ii) in aqueous medium free of organic solvents, surfactants and/or additional reducing agents into a three dimensional structure where graphene oxide and the nanoparticulate tetravalent vanadium oxohydroxide are intimately mixed [13] so as to form the precursor composite.

In one embodiment, the precursor composite described in the present invention may be produced by a method comprising the step of mixing tetravalent vanadium oxohydroxide with an aqueous graphene oxide solution.

In a third aspect, the present invention provides a method for producing an electrode material from the precursor composite. The method comprises the steps of drying the precursor composite, and of subjecting it to a temperature ranging from 50° C. to just below the decomposition temperature of the startEAM/oxEAM, e.g. about 200° C. for a tetravalent vanadium oxohydroxide, for a time suitable to reduce the graphene oxide to the desired degree by oxidizing the vanadium of the start-EAM.

Nanoparticles in the sense of the present invention are particles that have at least one dimension that does not exceed 500 nm, preferably does not exceed 300 nm.

The reduction/oxidation step can be performed in situ. For tetravalent vanadium oxohydroxide, a presently preferred temperature is about 180° C. This temperature is suitable to change $H_4V_3O_8$ to $H_{4-x}V_3O_8$. While x may range from 0.1 to 2.2, it is preferred that the graphene oxide is reduced to an extent corresponding to x about 2.

Due to the absence of carbon comprising material/compounds besides the graphene oxide, the present invention also provides a method to limit the carbon content in a RedGO and oxEAM composite electrode material to less than 5%, preferably to less than 4% or less than 3% but in general not less than 2%, while maintaining high performances such as high specific energy if used in an electrochemical cell.

The EAM used as a starting material is preferably $H_4V_3O_8$ that is converted to $H_{4-x}V_3O_8$ upon reduction of the graphene oxide. While the presently preferred vanadium compound used as starting material is pure $H_4V_3O_8$, the present invention also encompasses such material wherein part of the hydrogen is replaced by alkali metals like sodium and/or lithium, preferably lithium. Also encompassed are tetravalent vanadium oxohydroxides that are doped with other transition metals like Cr, Mn, and/or Mo.

Dependent on the actually chosen EAM, the heating temperature may vary. However in a first step it has to be maintained below the decomposition temperature, preferably at least 10° C. below the decomposition temperature.

If another modification or composition of the startEAM/oxEAM is desired, it is also within the scope of the present invention to add a step comprising heating to a higher temperature like up to 400° C.

The method of the present invention is especially suitable for startEAM/oxEAM with an anisotropy in their shape, e.g. with fibrous morphology. In the scope of the present invention, particles wherein one dimension exceeds the other dimensions by at least a factor of two, generally more than five, are termed fibers. Such fibers usually build lose aggregates with very few contact points between individual particles. This feature is a serious limitation to the implementation of such a fibrous active material in electrochemical devices. It is therefore an additional benefit of the present invention to provide the RedGO in a form allowing for charge transport within a matrix composed of anisotropic oxEAM particles. Such particles are wrapped within and linked together by RedGO-sheets resulting in a three dimensional mesoporous structure that may be used as such or that may incorporate additional electronically/electrochemically active compounds in the form of nanoparticles like transition metal oxides, transition metal phosphates, transition metal chalcogenides, transition metal halides, silicon and combinations thereof. Alone or in combination with the just mentioned nanoparticles metallic nanoparticles and/or semiconducting particles may also be incorporated. Such composite materials without incorporation of additional EAM or such composite materials incorporating additional EAM are suitable to form electrodes. Such electrodes can consist of the composite material or they may comprise such material as a e.g. coating on a guidewire.

In one embodiment, the electrode material described in the present invention may be produced from the precursor composite by a method comprising the steps of
(a) drying the precursor composite
(b) heating the dry precursor composite to a temperature of at least 50° C. but below the decomposition temperature of the vanadium oxohydroxide and for a time sufficient to induce the desired reduction of the graphene oxide with respective change in the oxidation state of the transition metal in the vanadium oxohydroxide.

In this reaction the graphene oxide in the originally formed and dried compound of graphene oxide and startEAM may be reduced to RedGO in situ, in the dry state and without the addition of a reducing agent other than the startEAM that during the graphene oxide reduction is oxidized. The state of the art teaches that the conversion of graphene oxide to RedGO involves a thermal treatment above 300° C. and temperatures lower than 300° C. so far were considered to be not sufficient to reduce graphene oxide for use in electrochemical applications.

In contrast to this belief, the present invention allows for the preparation of composite materials and electrodes that contain at least 95% active material by weight at low temperature. Due to the three dimensional structure of the RedGO-EAM composite, said electrode may be a free standing structure of said composite material.

However, if the EAM to be used in a battery is not thermally critical, a further heating step after step (b) may be added. Such additional heating step can be performed at high temperatures such as e.g. up to 400° C.

Also within the scope of the present invention is processing of the precursor composite prior to step (a) e.g. by at least one of coating, drop casting or pasting.

Dependent on the EAMs, the composite electrode may be used as positive or negative electrode in an electrochemical cell of an alkali metal or alkali ion battery.

Thus, an alkali metal or alkali ion battery comprising at least one electrochemical cell with one positive electrode and one negative electrode, at least one of said electrodes comprising an electrode material of the present invention is also a subject matter of the present invention, in particular such a battery wherein said positive electrode has a practical specific energy of at least 700 Wh/kg.

SHORT DESCRIPTION OF THE DRAWINGS

FIG. 10: Comparative example of the practical cathodic specific energy vs. cycles (100 A/kg) for the $H_{4-x}V_3O_8$-RedGO composite produced according to Example 3 (stars, cf. FIG. 8) and for the $H_2V_3O_8$-RedGO composite shown in FIG. 7 heated to 180° C. for 1 hour (crosses) both used as positive electrode in a lithium battery.

DESCRIPTION OF THE PREFERRED EMBODIMENTS

The invention is now further described for the embodiment with the EAM starting material $H_4V_3O_8$.

The startEAM $H_4V_3O_8$ is presently preferred because it seems to catalyze the reduction of graphene oxide. However, other transition metal compounds with similar electrochemical potential may also be suitable.

The most visible feature and, at the same time, the main advantages of the present invention resides in the simplicity of the method and in the quality of the compound material obtainable therewith. By using the method of the present invention, the formation of a precursor composite of graphene oxide and a tetravalent vanadium oxohydroxide is straightforward.

Dry solid $H_4V_3O_8$ is dispersed in an aqueous graphene oxide solution. The composite forms at once and water can be removed by evaporation.

Figure 9:
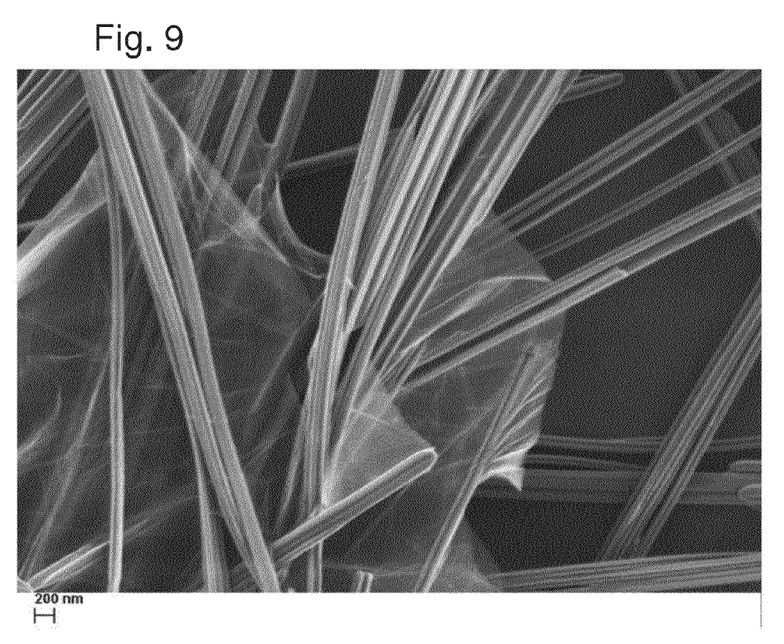
FIG. 9: SEM micrographs of the $H_4V_3O_8$-graphene oxide composite showing graphene oxide linking vanadium oxohydroxide fibers.

Typically, the composite consists of particles of EAM wrapped within graphene oxide sheets. The thickness of the graphene oxide sheets varies from 1 nm to 50 nm, and preferably is less than 20 nm. The EAM is not sandwiched between graphene oxide sheets in a layer-by-layer two-dimensional structure but rather linked by graphene oxide in a three-dimensional pattern, as shown in FIG. 9.

The precursor composite described above can then be converted to a RedGO/$H_{4-x}V_3O_8$ (0.1<x<2.2) oxohydroxide positive electrode material suitable for direct use as positive electrode in a lithium battery. The practical specific energy of such a positive electrode material reaches about 800 Wh/kg. The reduction of the graphene oxide to RedGO is carried out in situ, in the solid state, at temperatures below 200° C. and without the addition of a reducing agent other than the startEAM. In addition, the reduction of the graphene oxide can take place in air.

The method of the present invention is suitable to provide a composite wherein startEAM/oxEAM particles that are otherwise difficult to interconnect because of their shape are linked together in an electronically conducting network. In particular fibrous particles may build lose aggregates with very few contact points between individual particles. Such fibrous structures so far are considered as a serious limitation to the implementation of such a fibrous active material in electrochemical devices. According to the present invention, however, such fibrous material, like $H_{4-x}V_3O_8$ with x ranging from 0 to 2.2, can be additionally connected by graphene oxide/RedGO sheets.

The EAM/RedGO electrode material of the present invention allows for the preparation of composite electrodes that contain at least 95% active material by weight. Due to the porosity, however, incorporation of additional nanoparticulate EAM into the composite (said composite is then acting as matrix) is possible. Dependent on the additional EAM present the kind of electrode can be changed from positive (e.g. pure RedGO/$H_{4-x}V_3O_8$) to negative.

The composite electrode may be used as positive or negative electrode in an electrochemical cell.

For the sake of clarity and to allow for a better understanding of the present invention, some preferred embodiments are further illustrated in the Examples below. The following procedures are not meant to limit the scope of the present invention but rather to describe embodiments by way of example.

Example 1

Preparation of Starting Materials

Figure 1:
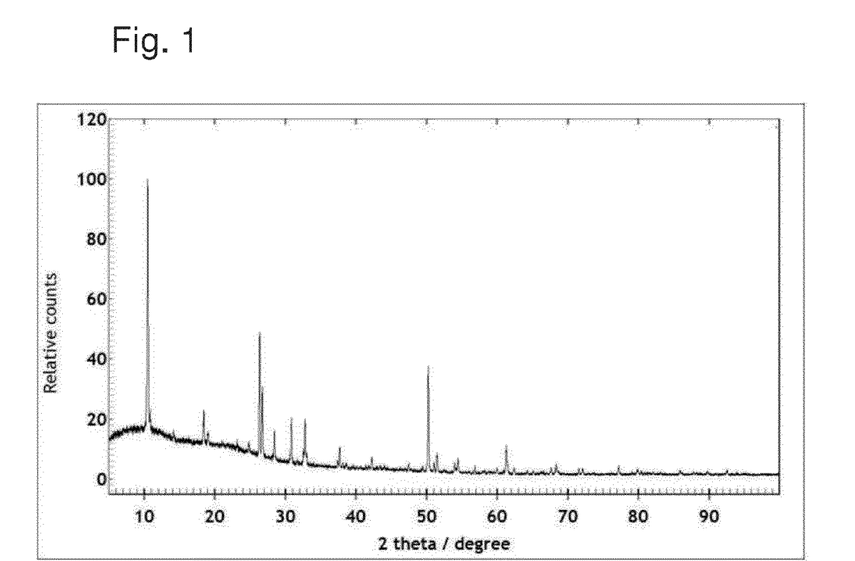
FIG. 1: XRD pattern of $H_2V_3O_8$ (Inorganic Crystal Structure Database ICSD 80572).
Figure 2:
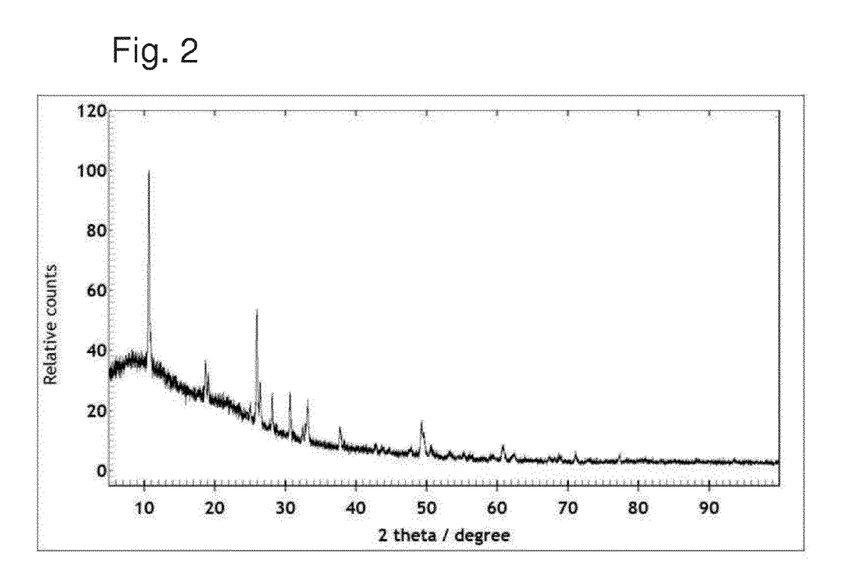
FIG. 2: XRD pattern of $H_4V_3O_8$.

Synthesis of $H_4V_3O_8$ $H_4V_3O_8$ can be synthesized from the precursor $H_2V_3O_8$ (ICSD 80572; XRD pattern, see FIG. 1) by one of the various procedures described in [13]. Ascorbic acid was chosen as the reducing agent for the synthesis of the H4V3O8 used in the present invention. For the XRD pattern see FIG. 2.

Synthesis of Graphite Oxide

Natural or synthetic graphite can be used as starting materials. Graphite oxide can be obtained by the Staudenmaier method, the Hummer and Offeman method or the Brodie method. The detailed individual procedures are available in the literature. The Graphite oxide used in the present invention was synthesized by a modified Brodie process, using sodium chlorate and fuming nitric acid as oxidizing reagents.

10 g graphite were thoroughly mixed with 85 g sodium perchlorate powder. The mixture was cooled to approx. −20° C. using an ice sodium chloride mixture and then slowly stirred with an efficient stirrer. Then 60 ml fuming nitric acid were very slowly added. The viscous green mass was stirred for an additional 30 minutes at room temperature. The mixture was left over night without agitation and then slowly heated to 60° C. for 10 hours. Then 2 liters of water were added to the reaction product, the mixture was filtered and once washed with diluted hydrochloric acid and at least twice, each time with 2 liters of water. After filtration, the obtained mass was freeze dried yielding about 14 g of graphite oxide as a very fluffy ivory colored powder.

Based on the elemental analysis of the graphite oxide the chemical formula $C_8O_4H_{1.7}$ results. After subtraction of hydrogen as water the formula $C_8O_{3.2}$ is obtained with a C/O ratio of 2.5. Using X-ray diffraction analysis it could be shown that the inter-planar distance of 3.35 Å in graphite was enlarged to 6.1 Å in dry graphite oxide.

Figure 3:
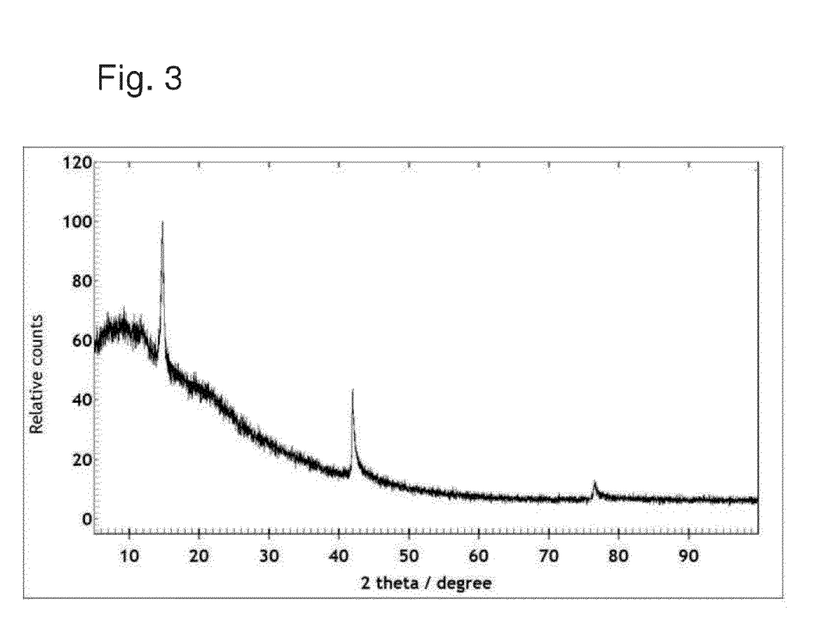
FIG. 3. XRD pattern of graphite oxide.

The C:O ratio of the graphene oxide powder lies between 2.5 and 3.5, preferably between 2.7 and 3.1, and is more preferably between 2.9 and 3.1. For the XRD pattern see FIG. 3.

Preparation of Graphene Oxide Solution 100 mg of graphite oxide powder was dispersed in 100 ml deionized water. The mixture was stirred at room temperature for 30 minutes to obtain a homogeneous golden suspension. 2 mg of lithium hydroxide monohydrate were added to the suspension, which turned immediately into a clear orange solution. Any other way to shift the pH value of the reaction mixture to higher than 7 yields a graphene oxide solution from a graphite oxide suspension.

Example 2 (FOR COMPARISON)

Figure 7:
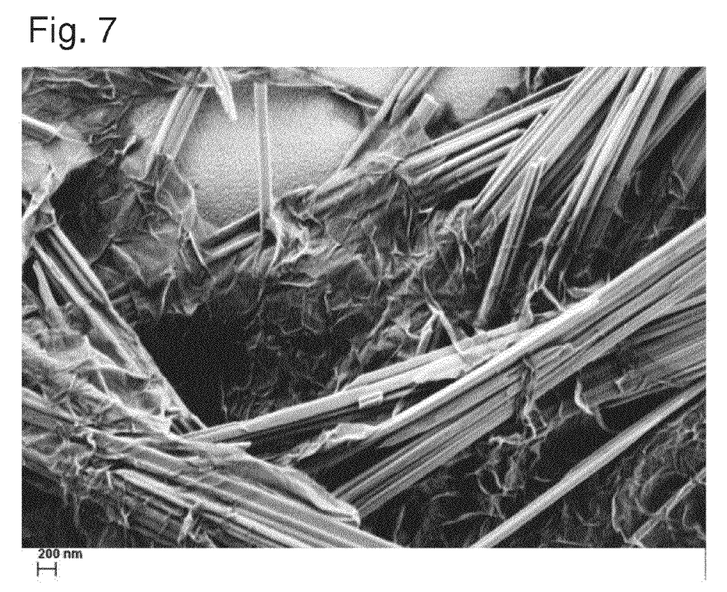
FIG. 7: SEM micrographs of the $H_2V_3O_8$-RedGO composite showing separated aggregates of vanadium oxohydroxide fibers next to RedGO sheets.

Preparation of $H_2V_3O_8$-RedGO Composite 95 mg of $H_2V_3O_8$ were added to a solution comprising 60 mg lithium ascorbate and 5 ml of graphene oxide solution. The mixture was autoclaved 20 minutes at 120° C. The resulting composite was isolated by filtration and dried 1 h at 180° C. in air. A SEM micrograph of this product is shown in FIG. 7.

Example 3

Preparation of the $H_{4-x}V_3O_8$-RedGO Composite of the Present Invention

Figure 4:
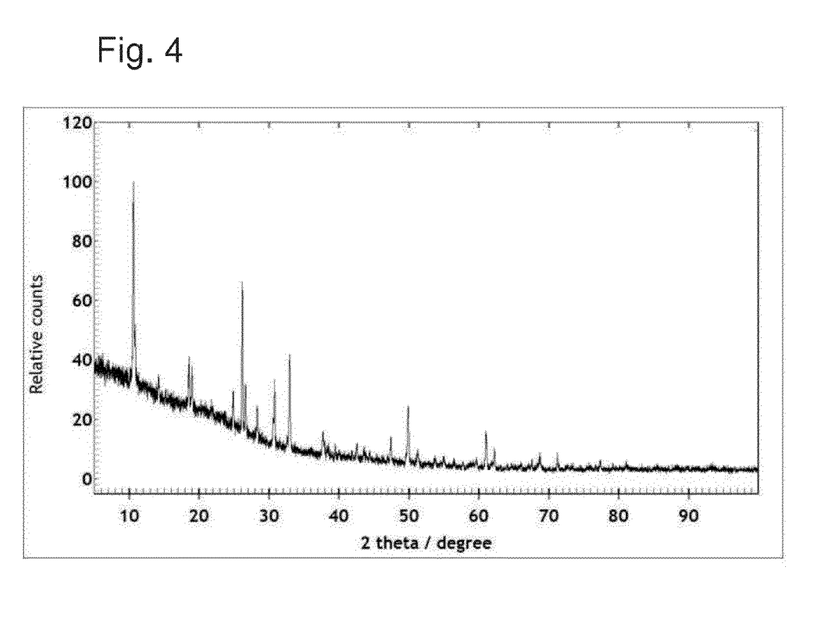
FIG. 4: XRD pattern of the $H_4V_3O_8$-graphene oxide (5% by weight) composite.
Figure 5:
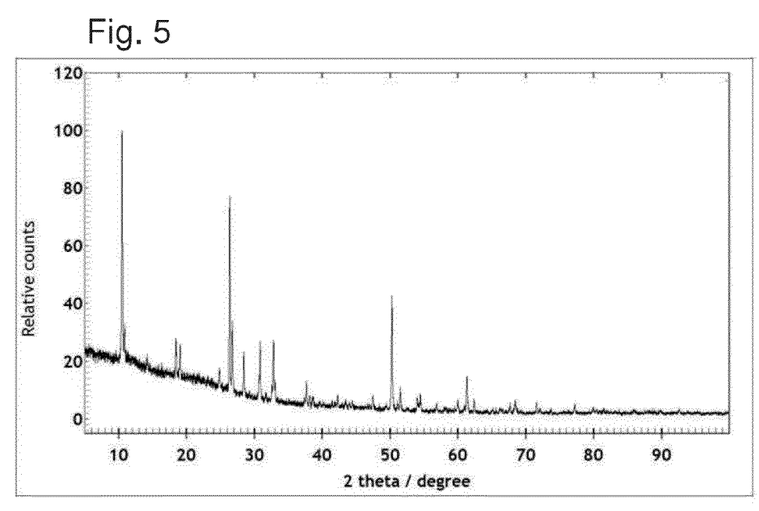
FIG. 5: XRD pattern of the $H_{4-x}V_3O_8$-RedGO composite obtained by thermal treatment (1 h at 180° C. in air) of the $H_4V_3O_8$-graphene oxide (5% by weight) composite.

Preparation of the $H_4V_3O_8$-Graphene Oxide Precursor Composite 95 mg of $H_4V_3O_8$ were added to a 5 ml graphene oxide solution upon vigorous stirring. The composite formed at once when solid $H_4V_3O_8$ was dispersed into the graphene oxide solution. The composite could then be further processed, say coated, drop-casted, pasted and so forth. Water was removed by evaporation. The XRD pattern of this product is shown in FIG. 4.

IR Spectroscopy of Pristine $H_2V_3O_8$, $H_4V_3O_8$, $H_4V_3O_8$-Graphene Oxide Composite IR spectroscopy measurements were used to confirm that tetravalent vanadium oxohydroxide and Graphene Oxide react together to form a composite. These measurements confirmed that the precursor composite according to the present invention is a true composite and not simply a blend of start-EAM and GO.

Figure 11A:
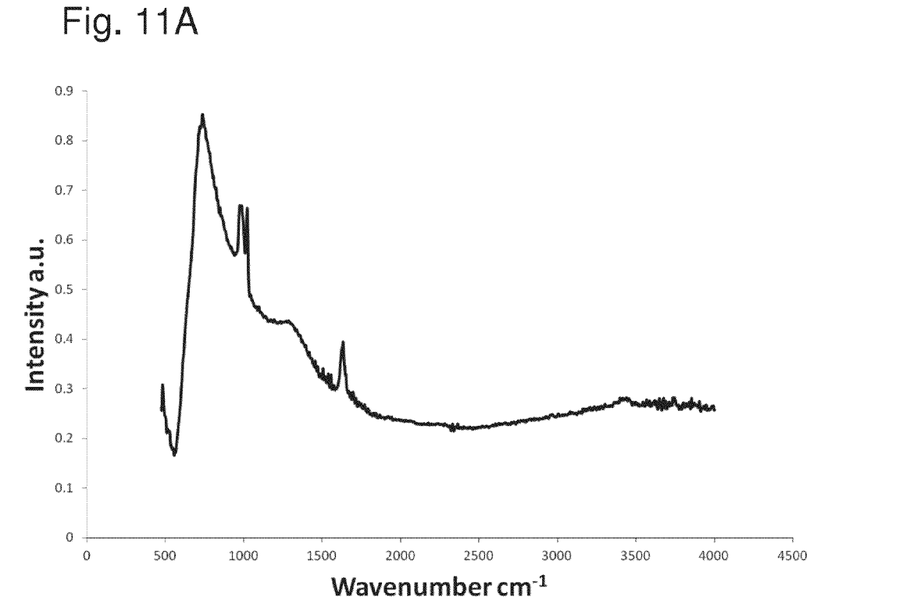
FIG. 11A: IR spectrum of $H_2V_3O_8$

For $H_2V_3O_8$ (for comparison) (FIG. 11A), four main bands were observed, corresponding to vanadium(V)-oxygen double bound stretching (1009 cm-1), to vanadium(IV)-oxygen double bound stretching (969 cm-1), bridging oxygen-vanadium-oxygen (around 780 cm-1) and bending vibrations of water (1658 cm-1).

Figure 11B:
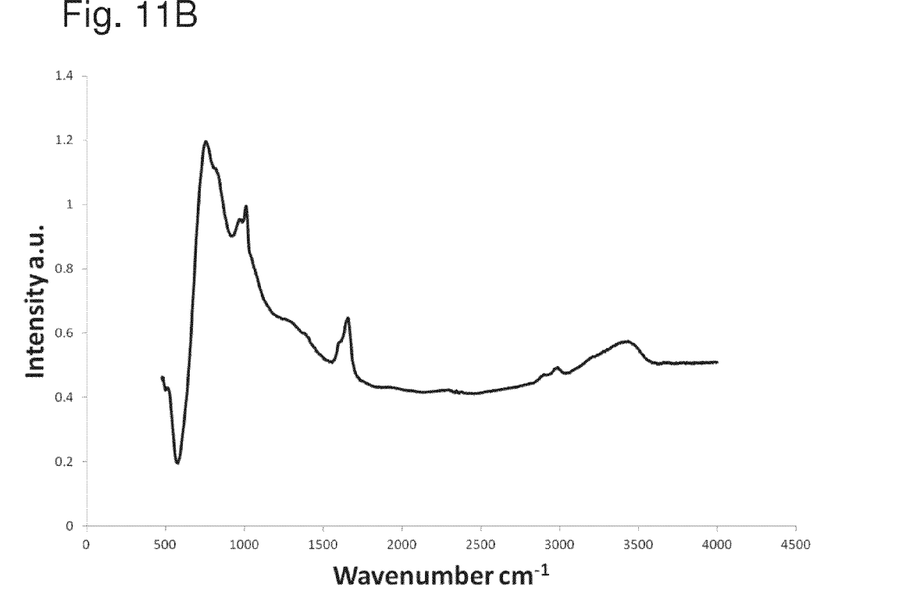
FIG. 11B: IR spectrum of $H_4V_3O_8$

The $H_4V_3O_8$ spectrum (FIG. 11B) features some major differences in comparison with the spectrum of $H_2V_3O_8$. In particular the bending vibrations of water (1658 cm-1) become more intense and broader. Since $H_4V_3O_8$ possesses twice as much structural water as $H_2V_3O_8$, a change in this region of the spectrum is expected. The second main difference lies in the double peak around 1000 cm-1. The shape of the peak is affected by the V5+/V4+ ratio. A characteristic feature is the appearance of a shoulder above 1000 cm-1 and an increase in the intensity in that same region. Third, the V—O—V bending around 780 cm-1 also changes shape.

Figure 11C:
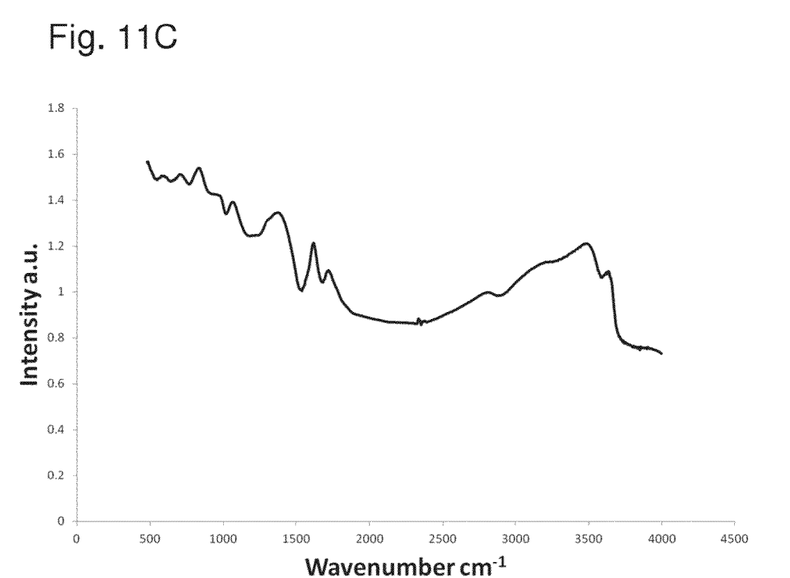
FIG. 11C: IR spectrum of GO

The GO spectrum (FIG. 11C) features characteristic bands for carbonyl-(1550-1700 cm-1), epoxy-(1250 cm-1) and hydroxyl (3200-3600 cm-1) groups. Carbon-carbon single and double bonds as well as carbon-hydrogen stretching vibrations are also present.

Figure 11D:
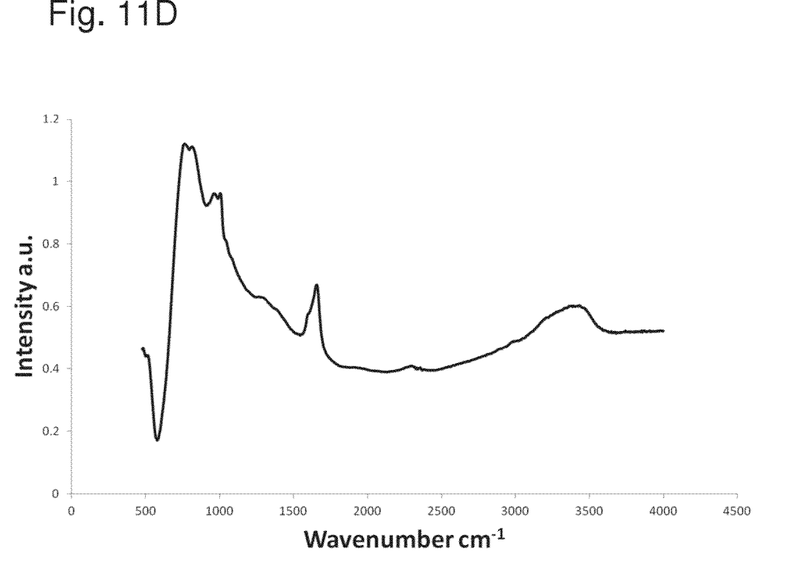
FIG. 11D: IR spectrum of $H_4V_3O_8$/GO composite
Figure 11E:
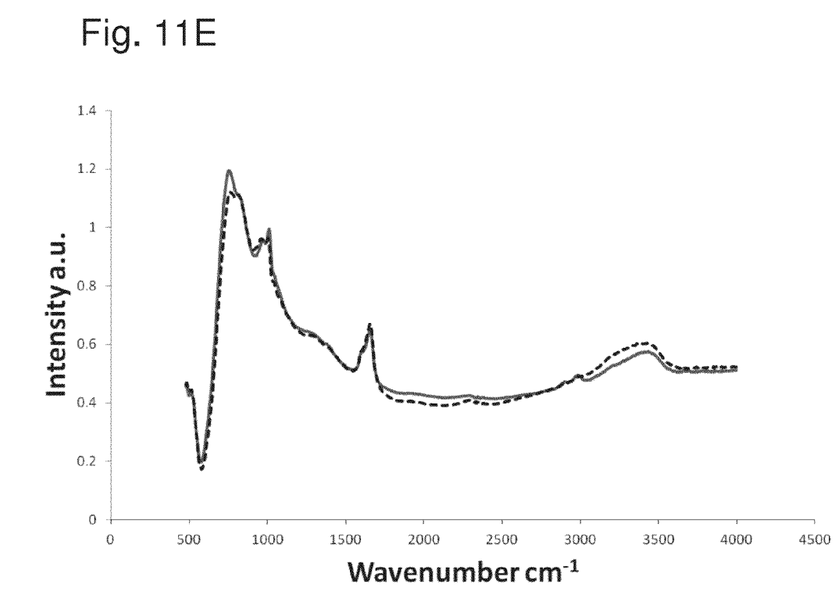
FIG. 11E: IR spectrum of $H_4V_3O_8$ and $H_4V_3O_8$/GO composite

5 w-% of GO was used in the composite (FIG. 11D). For that reason the bands from GO are not expected to become clearly visible in the spectrum of the mixture. However distinct features from pristine $H_4V_3O_8$ in the bands related to vanadium-oxygen bounds appear. The addition of as little as 5 w-% GO suffices to affect the properties of $H_4V_3O_8$. Therefore, composite formation has taken place since the IR spectrum of the composite differs from the simple superposition of the spectra of the starting materials (FIG. 11E).

Preparation of the $H_{4-x}V_3O_8$-RedGO Electrode Material $H_{4-x}V_3O_8$-RedGO composite electrode material was obtained by heating the dry $H_4V_3O_8$-graphene oxide composite in air.

Figure 6:
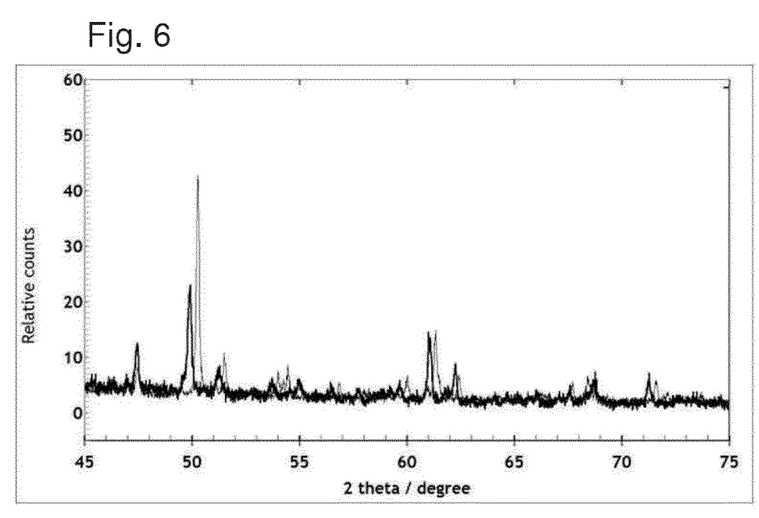
FIG. 6. Comparison of the XRD patterns of the $H_4V_3O_8$-graphene oxide composite (thick) and of the $H_{4-x}V_3O_8$-RedGO composite (thin) after thermal treatment 1 h at 180° C. in air. The pattern of the thermally treated composite (thin) shows the typical features of H2V3O8.
Figure 8:
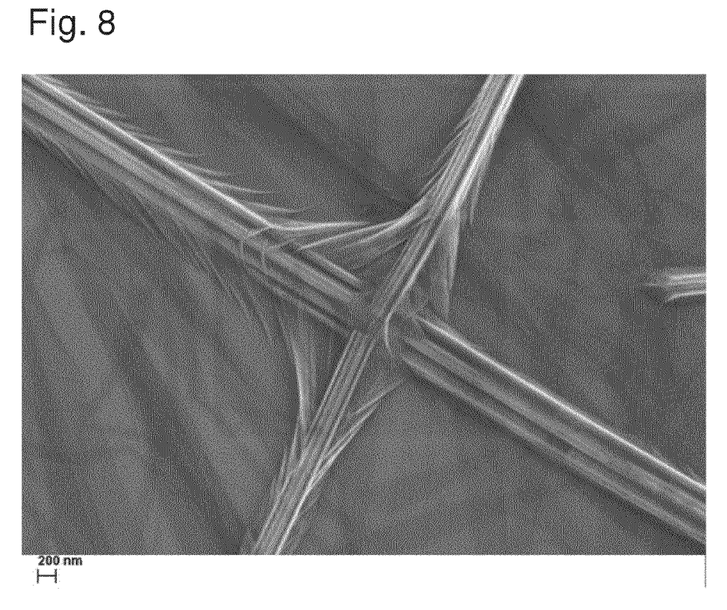
FIG. 8. SEM micrographs of the $H_4V_3O_8$-graphene oxide composite showing tetravalent vanadium oxohydroxide fibers wrapped into a graphene oxide sheets.

An increase of the temperature from 25° C. to 180° C. and keeping at 180° C. for 1 h triggered the reduction of the graphene oxide to reduced graphene oxide by the tetravalent vanadium oxohydroxide, while the later was partly oxidized to the pentavalent state. The dry graphene oxide-tetravalent vanadium oxohydroxide composite is grey while the reduced graphene oxide-pentavalent/tetravalent vanadium oxohydroxide is green. The value of x was about 2. A comparison of this composite material with the not yet reduced graphene oxide-EAM-composite is shown in FIG. 6. and two SEM images of the inventive compound material are shown in FIGS. 8 and 9

By variation of the temperature between 50° C. and about 200° C. and the time, other oxidation/reduction states can be obtained like x=0.1 to 2.2

Electrochemical Measurements $H_{4-x}V_3O_8$-RedGO Composite was used as the positive electrode in a lithium battery. The anode was Lithium metal, the electrolyte a 1M $LiPF_6$ solution of ethylene carbonate-ethylmethyl carbonate (1:1 by weight) and the cathode was free standing $H_{4-x}V_3O_8$-RedGO composite material.

Figure 10:
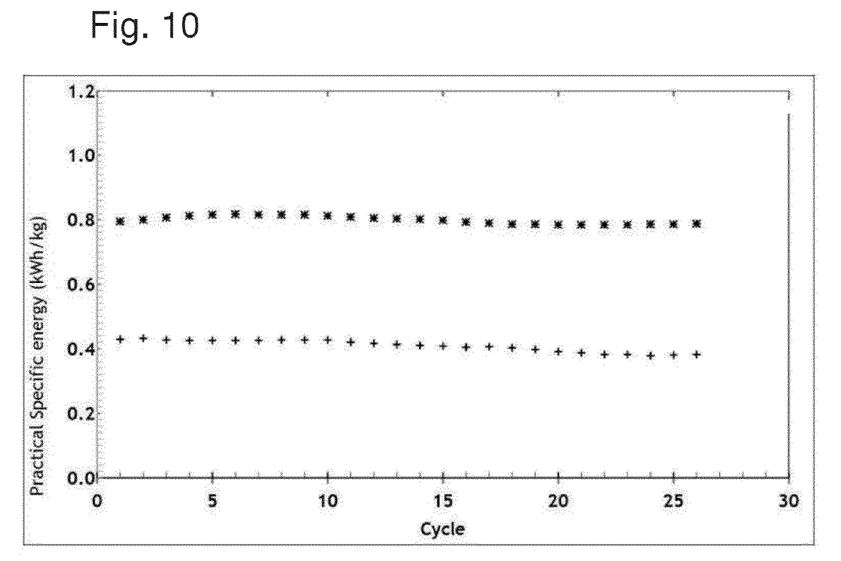

The specific capacity and the specific energy were computed using the practical mass of the cathode, that is the mass of the whole composite material. The cells were charged and discharge in galvanostatic mode at 100 A/kg between 4 V and 2.2 V vs. Li+/Li. The results are visualized in FIG. 10.

REFERENCES

[1] Daniel R. Dreyer et al., *Chem. Soc. Rev.,* 2010, 39, 228-240.
[2] K. S. Novoselov et al, *Science,* 2004, 306, 666-669.
[3] Yanwu Zhu et al., *Adv. Metr.,* 2010, 22, 3906-3924.
[4] Sasha Stankovich et al., *Carbon,* 2007, 45, 1558-1565.
[5] EP 2 445 049
[6] Tommy Kaspar, ETH Thesis 18931, 2010.
[7] US 2010/0081057 A1
[8] US 2010/0143798 A1
[9] US 2011/0045347 A1
[10] WO 2010030361
[11] Zhong-Shuai Wu et al., *ACS Nano,* 2010, 4, 3187-3194.
[12] US 2012/0088156 A1
[13] US 2013/0157138 A1

What is claimed is:

1. A precursor composite for an electrode material, said precursor composite comprising graphene oxide with a C:O ratio between 2.5 and 3.5, and an electrochemically active material (EAM) in nanoparticulate form comprising a tetravalent vanadium oxohydroxide.

2. The precursor composite of claim 1, wherein the C:O ratio of the graphene oxide is between 2.7 and 3.1.

3. The precursor composite of claim 1, wherein the particles of tetravalent vanadium oxohydroxide have an anisotropic morphology.

4. The precursor composite of claim 1, wherein the tetravalent vanadium oxohydroxide consists of H4V3O8.

5. The precursor composite of claim 1 incorporating at least one further EAM selected from the group consisting of transition metal oxide nanoparticles, transition metal phosphate nanoparticles, transition metal chalcogenide nanoparticles, transition metal halide nanoparticles, silicon nanoparticles, metallic nanoparticles, semiconducting nanoparticles and combinations thereof.

6. A method for preparing the precursor composite of claim 1, wherein the method comprises the step of
    mixing tetravalent vanadium oxohydroxide with an aqueous graphene oxide solution.

7. A method for producing an electrode material from the precursor composite of claim 1, the method comprising the steps of
    (a) drying the precursor composite;
    (b) heating the dry precursor composite to a temperature of at least 50° C. but below the decomposition temperature of the vanadium oxohydroxide and for a time sufficient to induce a desired reduction of the graphene oxide with respective change in the oxidation state of the transition metal in the vanadium oxohydroxide.

8. The method of claim 7 comprising a further heating step after step (b), said heating step comprising heating to up to 400° C.

9. The method of claim 7, wherein the precursor composite is processed prior to step (a) by at least one of coating, drop casting and pasting.

10. The method of claim 7 wherein the tetravalent vanadium oxohydroxide in the precursor composite is $H_4V_3O_8$, the heating step (b) is performed to a temperature below 200° C., for 1 hour, and the EAM in the final product is $H_{4-x}V_3O_8$ with x ranging from 0.1 to 2.2.

11. The method of claim 7, wherein the heating step (b) is performed in air.

12. The electrode material produced by the method of claim 7, wherein the carbon content of the material is at most 10% by weight.

13. The electrode material of claim 12, having a three dimensional mesoporous structure.

14. An electrode comprising the electrode material produced by the method of claim 7.

15. The electrode of claim 14, said electrode being a free standing structure of said electrode material.

16. An alkali metal or alkali ion battery comprising at least one electrochemical cell with one positive electrode and one negative electrode, at least one of said electrodes comprising an electrode material of claim 12.

17. The precursor composite of claim 1, wherein the C:O ratio of the graphene oxide is between 2.9 and 3.1.

18. The precursor composite of claim 1, wherein the particles of tetravalent vanadium oxohydroxide have a fibrous morphology.

19. The method of claim 7 wherein the tetravalent vanadium oxohydroxide in the precursor composite is H4V3O8, the heating step (b) is performed to a temperature below 180° C. for 1 hour, and the EAM in the final product is H4-xV3O8 with x ranging from 0.1 to 2.2.

20. The electrode material produced by the method of claim 7, wherein the carbon content of the material is at most 5% by weight.

* * * * *